United States Patent [19]

Akashi et al.

[11] 3,833,412

[45] Sept. 3, 1974

[54] MAGNETIC RECORDING MEDIUM

[75] Inventors: Goro Akashi; Masaski Fujiyama; Yasuyuki Yamada, all of Kanagawa, Japan

[73] Assignee: Fuji Photo Film Co., Ltd., Kanagawa, Japan

[22] Filed: June 25, 1971

[21] Appl. No.: 157,042

Related U.S. Application Data

[63] Continuation of Ser. No. 754,733, Aug. 22, 1968, abandoned.

[30] Foreign Application Priority Data

Aug. 24, 1967 Japan .............................. 42-54380

[52] U.S. Cl. ............... 117/240, 117/235, 252/62.54

[51] Int. Cl. ........................................... H01f 10/02

[58] Field of Search ......... 117/235, 240; 252/62.54, 252/62.55

[56] References Cited

UNITED STATES PATENTS

| | | | |
|---|---|---|---|
| 997,498 | 7/1911 | Headson | 117/235 X |
| 2,418,479 | 4/1947 | Pratt et al. | 117/235 X |
| 2,857,879 | 10/1958 | Johnson | 117/235 X |
| 3,069,815 | 12/1962 | Valentine | 117/235 X |
| 3,249,466 | 5/1966 | Lusher | 117/235 |
| 3,284,223 | 11/1966 | Watson | 117/235 X |
| 3,470,021 | 9/1969 | Hendricx et al. | 117/239 |
| 3,630,910 | 12/1971 | Akashi et al. | 117/240 |

OTHER PUBLICATIONS

Friedman et al., page 779, IBM Tech. Dis. Bull., Vol. 9, No. 7, Dec. 66.

*Primary Examiner*—William D. Martin
*Assistant Examiner*—Bernard D. Pianajo
*Attorney, Agent, or Firm*—Sughrue, Rothwell, Mion, Zinn & Macpeak

[57] ABSTRACT

A magnetic recording medium which comprises a support; a magnetic layer carried on said support, said magnetic layer comprising: a thermo-plastic resin binder which contains: ferromagnetic material dispersed th erein, an abrasive material having a size of less than 5 $\mu$ and a hardness greater than 6 on the Mohs hardness scale and a monobasic fatty acid having at least four carbon atoms and a melting point lower than 50°C. said monobasic fatty acid being present in an amount greater than about 0.1 percent by weight, based on the whole magnetic layer.

4 Claims, No Drawings

MAGNETIC RECORDING MEDIUM

CROSS-REFERENCE TO RELATED APPLICATION

The present application is a continuation of Ser. No. 754,733, filed Aug. 22, 1968 and now abandoned.

BACKGROUND OF THE INVENTION

1. Field of the Invention

This invention relates to a magnetic recording medium, more particularly to the composition of the magnetic recording layer of a magnetic recording medium such as a video tape, memory tape, and the like, in which durability is required.

2. Description of the Prior Art

A magnetic recording medium is produced, as is well-known in general, by applying a dispersion of powder particles of a ferromagnetic iron oxide or alloy dispersed in a binder, which is dissolved in a solvent, onto a non-magnetic support, such as a film of synthetic resin (or a metal film in certain specific cases). The composite is then generally dried.

The composition of a typical magnetic recording layer would comprise the following:

1. Resins for firmly binding the ferromagnetic particles to each other;
2. Antistatic agents to prevent the accumulation of an electrostatic charge on the magnetic layer;
3. Plasticizers to give suitable flexibility to the magnetic layer; and
4. Lubricants to reduce the abrasion on a magnetic head during use of the magnetic recording medium.

During the development of magnetic recording mediums, there really was no one magnetic recording medium which had excellent durability when formed from the above composition. This was due to the fact that the magnetic recording medium had to be durable in applications in which the running speed of the magnetic recording medium (with respect to the magnetic head) was extremely high, e.g., 38 m/sec. for memory tapes and video tapes as compared to 76 cm/sec. for a sound recording tape.

Moreover, in still reproduction using a video recording tape, a recent development, reproduction is carried out at 11–15 m/sec. (relative speed) and a frequency of 30 cycles/sec. for at least 30 minutes of reproduction, and sometimes for several hours, on the same portion of the stationary medium.

As a result of many studies and examinations in order to meet the severe requirements outlined, it was recognized that the life of recording mediums having the composition range known to the prior art was at most one minute (still reproduction) under the above described conditions. Further, as a result of the examination of conditions of repeated reproduction with a broadcasting video tape recorder ("Model 1000" made by Ampex Corp. of the U.S.) in which the relative speed of the magnetic recording medium to a magnetic head was 38 m/sec., it was found that the "repetition" life of the medium was usually only about 50 when the recording head was strongly pressed into the recording tape during the magnetic recording, i.e., the magnetic head was pressed into the tape about 1.5 mils deeper than a standard depth.

SUMMARY OF THE INVENTION

It has been found that a very durable magnetic recording medium which will clean a magnetic head during running and not exhibit "drop-out" can be formed by incorporating an abrasive material having a size less than 5 $\mu$ and a hardness greater than 6 on the Mohs scale and a monobasic fatty acid having more than four carbon atoms and a melting point lower than 50°C in a magnetic layer, which comprises a ferromagnetic material and a thermoplastic resin carried on a support.

Representative supports, thermoplastic resins, abrasive materials and fatty acids are disclosed in the examples.

An object of the present invention is to provide a magnetic recording medium which has improved durability and which is capable of cleaning the magnetic head during running, thereby enabling the magnetic recorder to record or reproduce electromagnetic signals without any drop-out.

DESCRIPTION OF THE PREFERRED EMBODIMENTS

The present invention provides a magnetic recording medium in which a magnetic layer comprising ferromagnetic powder particles dispersed in a binder is applied to a support, a magnetic layer being characterized by having incorporated therein abrasive particles having a particle size less than 5 $\mu$, and a hardness greater than 6 in the Mohs hardness scale, such as orthoclase, quartz, rock crystal, topaz, corundum, garnet, zirconia, alumina, silicon carbide, boron carbide, titanium carbide, tungsten carbide, chrome oxide, molybdenum and the like, and a monobasic fatty acid having at least four carbon atoms and a melting point lower than 50°C, such as caprylic acid, capric acid, lauric acid, linolenic acid, linolic acid, oleic acid, and the like, in an amount greater than about 0.1 percent (by weight) based on the weight of the whole magnetic layer.

The invention will now be explained further by the following examples.

COMPARATIVE EXAMPLE 1

| | parts (by weight) |
|---|---|
| $\gamma$-$Fe_2O_3$ powder (particle size: 0.3 $\mu$ × 0.05 $\mu$) | 300 |
| Vinyl chloride-vinyl acetate copolymer | 40 |
| Epoxy resin | 30 |
| Anionic surface active agent | 10 |
| Methylethylketone | 300 |
| Isopropyl alcohol | 60 |
| Toluene | 300 |

A dispersion was prepared by using the above ingredients, and was applied to a polyethylene terephthalate film having a thickness of 25 $\mu$, the dispersion thickness (after drying) being 10 $\mu$. After drying, the film was treated with a super-calender to smooth a surface thereof in order to produce a magnetic recording medium. The film was slit into tape form to form a series of comparative samples (entitled "Type" in the following inventive examples).

EXAMPLE 1

A magnetic recording medium entitled Sample No. 1 was produced by the same procedure as in Comparative Example 1, but with the addition of 7 parts of oleic acid and 4.5 parts of chrome oxide having a particle size of 1.5 $\mu$.

By employing a broadcasting four-head video tape recorder the Type and Sample No. 1 materials (formed into an endless belt) were utilized in reproduction tests. It was found that reproduction was impossible after 36 cycles with the Type material, but was possible after 400 cycles with Sample No. 1. The examination was stopped at 400 cycles.

EXAMPLE 2

Magnetic recording media entitled Samples No. 2, No. 3, No. 4, No. 5 and No. 6 were produced by the same procedure as in Comparative Example 1. Specifically, the composition described in the Comparative Example was used, but 10 g of chrome oxide having a particle size of 1.5 μ were added and the oleic acid content was varied from 0–20 g in the samples. The reproducing characteristics were determined with the same procedure as in Example 1, and are shown in the following Table (Table 1).

TABLE 1

| Sample | Amount of chrome oxide (g) | Amount of oleic acid (g) | Number of times of reproduction |
|---|---|---|---|
| No. 2 | 10 | 0 | 116 |
| No. 3 | 10 | 0.6 | 170 |
| No. 4 | 10 | 3 | 241 |
| No. 5 | 10 | 5 | greater than 400 |
| No. 6 | 10 | 10 | greater than 400 |

As shown in Table 1, the reproducing characteristics of these magnetic recording mediums were improved as the amount of oleic acid increased. Though improvement in the durability was recognized when 0.6 g. of oleic acid was used, it is preferred to use more than 0.1 percent (by weight) based on the whole magnetic layer of the acid.

Judging from surface property of the sample tapes used in the determination of the durability, the effect of oleic acid may depend on its lubricating function, since the magnetic head trace generated on the surface of the tape is greatly reduced as the amount of oleic acid present is increased.

EXAMPLE 3

Samples of a magnetic recording medium were produced by the same composition and procedure as in Comparative Example 1, with the exception that 10 g of chrome oxide were added to each sample and 7 g of several different kinds of monobasic fatty acids were added to the samples (1 per sample) to determine their effectiveness.

TABLE 2

| Sample | Amount of chrome oxide (g) | Type of monobasic fatty acid | Melting Point (°C) | Number of times of reproduction |
|---|---|---|---|---|
| No. 7 | 10 | Caprylic acid | 16.5 | 340 |
| No. 8 | 10 | Capric acid | 31.3 | greater than 400 |
| No. 9 | 10 | Lauric acid | 44.0 | greater than 400 |
| No. 10 | 10 | Palmitic acid | 62.6 | greater than 400 |
| No. 11 | 10 | Stearic acid | 69.3 | greater than 400 |
| No. 12 | 10 | Linolenic acid | −11.0 | 375 |
| No. 13 | 10 | Linolic acid | −5∼11 | 380 |

As shown in Table 2, the durability of these sample tapes was good, but it was found that when palmitic acid or stearic acid (which have a melting point higher than 50°C) was used, it was not completely practical to use the tape since an exuding phenomenon was observed in the sample during storage.

EXAMPLE 4

Magnetic recording tapes were produced by the same procedures and employing the same composition as in Comparative Example 1 with the exception that 7 g of olefic acid and 10 g of several different kinds of abrasive material were added to each tape, that is 7 g of acid and a different abrasive material per tape.

TABLE 3

| Sample | Abrasive Material | Particle size (μ) | Durability (number of times of reproduction) |
|---|---|---|---|
| No. 14 | $Al_2O_3$ | 1 | greater than 400 |
| No. 15 | SiC | 0.8 | greater than 400 |
| No. 16 | Garnet | 1.2 | greater than 400 |
| No. 17 | $SiO_2$ | 0.7 | 320 |

It is clear from Table 3 that almost all materials having a hardness greater than 6 on the Mohs hardness scale functioned in a manner similar to the chrome oxide.

According to the present invention, the magnetic head is kept clear at all times by adding the abrasive material, and the durability of the magnetic tape is also improved thereby. Durability is further improved when a monobasic acid is employed in combination with the abrasive material.

It is to be noted that the same results were obtained when employing other resins such as polyurethane, urea resins, phenol resins, nitrocellulose and vinyl chloride-vinyl acetate copolymers, so that the invention is not to be limited to a single binder.

The abrasive material used in this invention preferably has a particle size of less than 5 μ. If the particle size is over 5 μ, it is not possible to get suitable magnetic characteristics because the surface of the magnetic layer will not be even enough. As the abrasive materials, powders of hard materials, having a hardness greater than 6 on the Mohs hardness sclae are effective.

As the magnetic material, not only $\gamma$-$Fe_2O_3$ but $Fe_3O_4$, Co-ferrites, Ba-ferrites, Fe-Co alloys, Fe-Co-Ni alloys and Fe-Co-Cu alloys are effective.

What is claimed is:

1. A magnetic recording medium having excellent durability which comprises a support;

a magnetic layer carried on said support, said magnetic layer comprising:

a binder which contains:

ferromagnetic material dispersed therein, an abrasive material having a size of less than 5 $\mu$ and a hardness greater than 6 on the Mohs hardness scale, the amount of said abrasive material being sufficient to provide excellent durability for said magnetic recording medium, and a monobasic fatty acid having at least four carbon atoms and a melting point lower than 50°C, selected from the group consisting of caprylic acid, capric acid, lauric acid, linolenic acid, linolic acid and oleic acid, said monobasic fatty acid being present in an amount greater than about 0.1 percent by weight, based on the whole magnetic layer.

2. The magnetic recording medium claimed in claim 1, wherein said ferromagnetic material is selected from the group consisting of $\gamma$—$Fe_2O_3$, $Fe_3O_4$, Fe-Co alloy, Fe-Co-Ni alloy and Fe-Co-Cu alloy.

3. The magnetic recording medium claimed in claim 1, wherein said abrasive material is selected from the group consisting of orthoclase, quartz, rock crystal, topaz, corundum, garnet, zirconia, alumina, silicon carbide, boron carbide, titanium carbide, tungsten carbide, chrome oxide and molybdenum.

4. A magnetic recording medium having excellent durability and useful in still reproduction consisting essentially of a suport and a magnetic layer coated thereon, said magnetic layer consisting essentially of, dispersed in a binder, ferromagnetic material, an abrasive material having a size less than 5 microns and a hardness greater than 6 on the Mohs hardness scale and a monobasic fatty acid having at least four carbon atoms and a melting point lower than 50°C. selected from the group consisting of caprylic acid, capric acid, lauric acid, linolenic acid, linolic acid and oleic acid, said monobasic fatty acid being present in said magnetic layer in an amount of greater than about 0.1 percent by weight, based upon the weight of said magnetic layer, and said abrasive material being present in said magnetic layer in an amount sufficient to provide excellent durability for said magnetic recording medium.

* * * * *